United States Patent [19]

Canterberry et al.

[11] Patent Number: 5,024,160

[45] Date of Patent: Jun. 18, 1991

[54] RAPID BURNING PROPELLANT CHARGE FOR AUTOMOBILE AIR BAG INFLATORS, ROCKET MOTORS, AND IGNITERS THEREFOR

[75] Inventors: J. B. Canterberry, Taft, Tenn.; David A. Flanigan, Ogden, Utah

[73] Assignee: Thiokol Corporation, Ogden, Utah

[21] Appl. No.: 158,829

[22] Filed: Feb. 11, 1988

Related U.S. Application Data

[62] Division of Ser. No. 908,763, Sep. 18, 1986, Pat. No. 4,798,142.

[51] Int. Cl.$^5$ .................. B60R 21/28; F42B 3/00
[52] U.S. Cl. .................. 102/323; 102/324; 102/326; 102/290; 280/741
[58] Field of Search .............. 102/323, 324, 326, 290; 280/741

[56] References Cited

U.S. PATENT DOCUMENTS

| | | | |
|---|---|---|---|
| 2,961,710 | 11/1960 | Stark | 18/48 |
| 2,977,885 | 4/1961 | Perry, Jr. et al. | 102/98 |
| 3,022,735 | 2/1962 | Eberle | 102/98 |
| 3,109,374 | 11/1963 | Rumbel et al. | 102/98 |
| 3,109,375 | 11/1963 | Rumbel et al. | 102/98 |
| 3,125,542 | 3/1964 | Haines | 260/2.5 |
| 3,140,663 | 7/1964 | Rumbel et al. | 102/98 |
| 3,163,113 | 12/1964 | Davis et al. | 102/98 |
| 3,165,483 | 1/1965 | Gemeinhardt et al. | 260/2.5 |
| 3,171,820 | 3/1965 | Volz | 260/2.5 |
| 3,175,025 | 3/1965 | Geen et al. | 260/2.5 |
| 3,175,030 | 3/1965 | Geen | 264/80 |
| 3,191,153 | 6/1965 | Mulloy | 102/289 X |
| 3,222,433 | 12/1965 | Makay, Jr. | 264/3.1 |
| 3,230,281 | 1/1966 | Carraz | 264/3 |
| 3,308,210 | 3/1967 | Ross | 264/3 |
| 3,316,718 | 5/1967 | Webb | 60/255 |
| 3,316,842 | 11/1967 | Schulz | 102/100 |
| 3,367,268 | 2/1968 | Spenadel et al. | 102/102 |
| 3,389,025 | 6/1968 | Nix et al. | 149/19 |
| 3,499,283 | 3/1970 | Simpkins | 60/39.47 |

(List continue on next page.)

*Primary Examiner*—Peter A. Nelson
*Attorney, Agent, or Firm*—James C. Simmons; A. H. Erickson

[57] ABSTRACT

A rapid burning propellant charge for applications including igniters, launch eject motor, and gas generators for automobile air bags. The propellant charge comprises a reticulated substrate having a quantity of interconnected ligaments and a coating of solid propellant material on the ligaments. In order to provide a large amount of surface area for a fast burn time, interstices are between coated ligaments to define propellant surface area for combustion. In applications where minimum smoke is desired, the reticulated substrate is preferably composed of carbon, graphite, or a non-combustible material, and the solid propellant material is preferably a minimum smoke type.

9 Claims, 3 Drawing Sheets

| | | | |
|---|---|---|---|
| 3,616,841 | 11/1971 | Walz | 164/34 |
| 3,664,133 | 5/1972 | Iwanciow et al. | 60/255 |
| 3,711,115 | 1/1973 | Lohr | 280/150 AB |
| 3,756,025 | 9/1973 | McCullough | 60/255 |
| 3,764,420 | 10/1973 | Sayles | 149/21 |
| 3,807,171 | 4/1974 | Anderson | 60/255 |
| 3,811,380 | 5/1974 | Glass | 102/49.7 |
| 3,822,645 | 7/1974 | Alexander | 102/102 |
| 3,827,715 | 8/1974 | Lynch | 280/150 AB |
| 3,829,537 | 8/1974 | Rosenthal | 264/3.1 |
| 3,860,678 | 1/1975 | Martin et al. | 264/3.2 |
| 3,897,221 | 7/1975 | Salyer et al. | 264/44 |
| 3,925,122 | 12/1975 | Berthmann et al. | 149/2 |
| 3,946,039 | 3/1976 | Walz | 264/332 |
| 3,972,545 | 8/1976 | Kirchoff et al. | 280/735 |
| 4,072,546 | 2/1978 | Winer | 149/19.8 |
| 4,083,905 | 4/1978 | Insley et al. | 264/63 X |
| 4,085,173 | 4/1978 | Lomax, Jr. et al. | 264/3.1 |
| 4,116,466 | 9/1978 | Gehrig | 280/736 |
| 4,321,220 | 3/1982 | Camp | 264/3.1 |
| 4,337,218 | 6/1982 | Byrd et al. | 264/3.1 |
| 4,370,181 | 1/1983 | Lundstrom et al. | 149/2 |
| 4,418,622 | 12/1983 | Foster et al. | 102/307 |
| 4,547,342 | 10/1985 | Adams et al. | 422/166 |
| 4,574,700 | 3/1986 | Lewis | 102/287 |
| 4,764,319 | 8/1988 | Hightower, Jr. | 264/3.4 |
| 4,793,955 | 12/1988 | Poulter et al. | 264/3.3 |

FOREIGN PATENT DOCUMENTS

| | | |
|---|---|---|
| 1090144 | 11/1961 | Fed. Rep. of Germany . |
| 959832 | 1/1948 | France . |
| 1547698 | 10/1967 | France . |
| 45-20199 | 7/1970 | Japan . |
| 42193 | 4/1962 | Luxembourg . |
| 534900 | 3/1941 | United Kingdom . |
| 660789 | 11/1951 | United Kingdom . |
| 876992 | 9/1961 | United Kingdom . |
| 885409 | 12/1961 | United Kingdom . |
| 963490 | 7/1964 | United Kingdom . |
| 972724 | 10/1964 | United Kingdom . |
| 1172221 | 11/1969 | United Kingdom . |
| 1490511 | 11/1977 | United Kingdom . |

OTHER PUBLICATIONS

Brochure, "Duocel, a New Basic Design Material", by Energy Research and Generation, Inc.

Technical Report AFRPL-TR-68-232, Dec. 1968, "Foamed Aluminum Propellant Study".

Brochure, "Duocel Foam Metal, a New Basic Design Material for Energy Absorption and Structural Applications", by Energy Research and Generation, Inc.

Brochure, "Duocel Foam Metal, a New Basic Design Material, Passive Omnidirectional Borehole Deformation Gauge", by Energy Research and Generation, Inc.

Brochure, "ERG Evolutionary Basic Design Material", by Energy Research and Generation, Inc.

Brochure, "Reticulated Vitreous Carbon", by Energy Research and Generation, Inc.

"Scott, Chemotronics Get Reticulation Patents", C&EN, Jun. 1, 1965, p. 42.

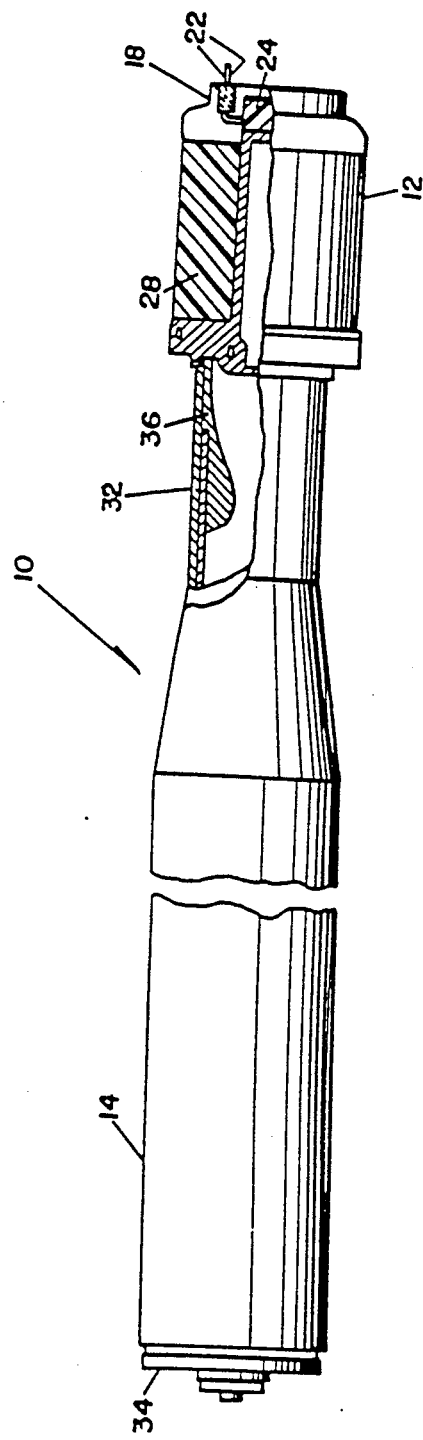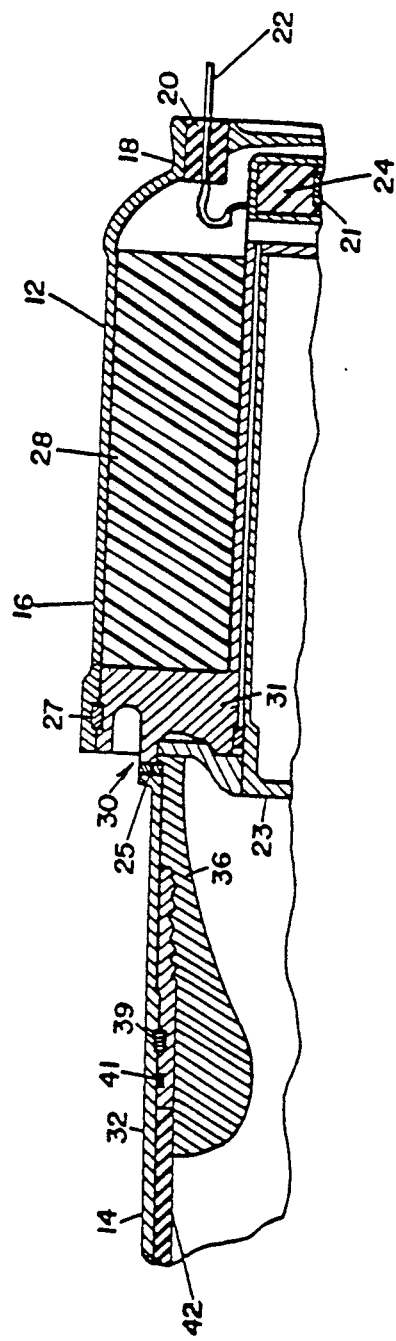

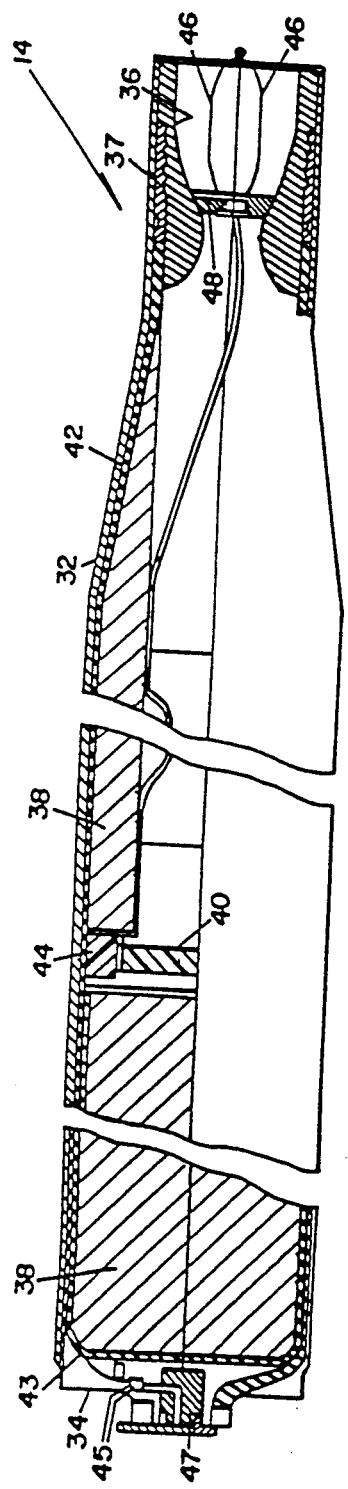
Fig. 3
Fig. 4
Fig. 5

RAPID BURNING PROPELLANT CHARGE FOR AUTOMOBILE AIR BAG INFLATORS, ROCKET MOTORS, AND IGNITERS THEREFOR

This is a divisional of co-pending application Ser. No. 908,763 filed on Sept. 18, 1986, now U.S. Pat. No. 4,798,142.

The present invention relates to solid propellant charges. Uses of the propellant charges of the present invention include, but are not limited to, igniters and launch eject motors where it is desired that the propellant charges burn rapidly for rapid development of heat or thrust. Other uses of the propellant charges of the present invention are as gas generators for automobile air bag inflators as well as other apparatus where it is desired to produce inflating gas rapidly. Therefore, for the purposes of this specification and the claims, a "propellant charge" is meant to include gas generators for air bag inflation systems and other inflation systems. However, it should be understood that this invention is not limited to just these uses, but may find uses, for example, as main propulsion propellant charges for rocket motors.

A typical solid propellant charge includes a fuel such as aluminum particles and an oxidizer such as ammonium perchlorate which are usually bound together by a binder such as hydroxy terminated polybutadiene. The binder may also act as a fuel. Where the fuel and oxidizer are separate materials which are mixed together to form the propellant, the propellant is known as a "composite propellant."

A composite propellant is usually manufactured by blending the ingredients into a thick and viscous but still pourable mixture which is then added to the rocket motor chamber where the mixture is cast and cured into a solid mass of propellant material in position for use. For some applications such as igniters and air bag inflators, the propellant mixture may be extruded into a desired geometric shape such as, for example, pellets for an air bag inflator, as illustrated at 62 in U.S. Pat. No. 4,547,342 to Adams et al.

In a solid propellant charge, burning proceeds in a direction perpendicular to the surface at all times. Thus, in a type of rocket motor known as an end burner wherein the propellant grain is a solid mass of propellant without a perforation therein, burning is initiated at the nozzle end and proceeds in a direction toward the head end of the rocket. The burning time for an end burner type of propellant grain is relatively slow compared to those propellant grains which are perforated longitudinally usually along their longitudinal center lines. In this type of grain, burning may be initiated along the entire length of the propellant grain so that the burning proceeds from the perforation radially outwardly toward the rocket motor case. The burning time for a propellant charge is also determined by the shape of the internal perforation, the shape known as a "tube shape" or "center perforate" being relatively slower burning, for example, than the shape known as the "internal star shape" of propellant grain.

Tactical weapons such as canister fired missiles may use launch eject motors containing solid propellant charges for ejecting missiles out of their canisters before their main motors ignite. It is desirable that the propellant grain for the launch eject motor as well as the propellant charge for the igniter for the flight motor thereof be of the smokeless or minimum smoke type since large quantities of smoke or exhaust including any toxic gas therein may be injurious to the operators thereof, and the smoke or exhaust may undesirably hinder visibility of the target which visibility must be maintained after launch for control of the missile. However, smokeless or minimum smoke propellants do not usually burn as fast as is normally desired. Further, this type of propellant tends to become soft in the high temperatures typically encountered or which may be encountered in areas of the world where such tactical weapons may be used. If the propellant becomes too soft and its physical state is as a result altered such as during acceleration as the missile is ejected from the canister, the burning properties of the propellant are accordingly altered resulting possibly in an inadequate burning rate or possible explosion of the launch eject motor.

It has been suggested in U.S. Pat. No. 3,191,535 to Mulloy to prepare a solid propellant which consists essentially of a cellular fuel element having uniform interconnecting spherical voids of a metal or metal alloy, and a propellant material filling the voids.

It has also been suggested in U.S. Pat. Nos. 3,616,841 and 3,946,039 to Walz that form retaining reticulated structures of metal or the like may be used as solid propellant reinforcement and burning rate modifiers. These Walz patents, which are hereby incorporated herein by reference and made a part of this specification, describe methods for producing such a reticulated structure by using as a pattern a self-supporting reticulated polyurethane or organic foam formed of ligaments to provide a substantially homogeneous reticulated structure which may have a wide range of pore sizes, varying from 3 to 125 pores per linear inch, and the finished foam material is characterized as having ligaments which are continuous, gas-free or of low porosity, and of integral construction.

U.S. Pat. No. 4,321,220 to Camp discloses a method for strengthening a propellant charge by incorporating a support structure in the propellant charge. The method is disclosed as comprising slowly traversing a flexible perforated material through a propellant lacquer until the desired loading is obtained. Camp states that the "reinforcing" substrate is perforated or the like so that it is "permeable to propellant decomposition gases which evolve during storage" and should also be strong and have a low density. Although Camp states that the "reinforced" propellant should have a "waffle appearance" so as to have "desirably increased surface area", the disclosure in Camp addresses the problems of increasing propellant strength, and the "waffle appearance", while a step in the right direction, still does not provide a sufficiently rapid burning smokeless or minimum smoke propellant charge. The Walz patents do not disclose increasing propellant charge surface area to achieve more rapid burning thereof and do not therefore afford an adequate solution to the problem either.

It is therefore an object of the present invention to provide a smokeless or minimum smoke propellant charge which is rapid burning, i.e., has a fast burn time. "Burn time" refers to the time it takes to burn a specified volume of a propellant charge and varies depending on the physical configuration of the propellant charge as well as the type of propellant. On the other hand, "burn rate" perpendicular to the surface of a propellant is constant for a particular propellant material.

It is another object of the present invention to provide such a smokeless or minimum smoke propellant grain or charge which is also capable of withstanding high acceleration forces even when the propellant material has a tendency to become soft in high temperatures.

One suggestion for solution to the problem of slow burn times for smokeless or minimum smoke propellants has been to add burn rate catalysts such as lead and/or copper salts to the propellants to control their ballistic behavior, i.e., increase their burn rates. However, because of the toxicity of such additives, it is also desirable to eliminate them from the propellant charges. It is therefore a still further object of the present invention to provide a smokeless or minimum smoke propellant charge with decreased burn time but which does not contain such toxic substances.

Igniter propellant material which consists of pellets of boron and potassium nitrate must be placed in a housing such as a wire basket or tube which is perforated so that the propellant gases from the igniter may communicate with a propellant grain for ignition thereof. Such wire baskets or perforated tubes may get blown off during the ignition phase or get plugged up both of which conditions affect the safety of the rocket. It is a further object of the present invention to eliminate such a basket or tube for an igniter and thus also reduce the expense thereof.

It is still a further object of the present invention to provide an automobile air bag inflator which is capable of utilizing a decreased burn time gas generator propellant charge.

It is another object of the present invention to reduce the hazards to a propellant charge which may result from shock waves or static discharge.

It is still a further object of the present invention to provide decreased burn time of a propellant charge.

It is yet a further object of the present invention to provide a fast burn time propellant charge which is safe, reliable, and non-toxic.

The above and other objects, features, and advantages of this invention will be apparent in the following detailed description of the preferred embodiments thereof which is to be read in connection with the accompanying drawings.

In the Drawings:

FIG. 1 is a side view of a canister fired missile embodying the present invention with a portion of the case broken away;

FIG. 2 is a half cross-sectional view, taken in a longitudinal plane, providing a detailed view of the broken away portion of FIG. 1;

FIG. 3 is a partially cross-sectional view, taken in a longitudinal plane, of the flight motor of FIG. 1;

FIG. 4 is a perspective view of a portion of a reticulated structure for a solid propellant charge embodying the present invention;

FIG. 5 is a sectional enlarged view of a portion of a solid propellant charge embodying the present invention, including a portion of the reticulated structure of FIG. 4.

DETAILED DESCRIPTION OF THE PREFERRED EMBODIMENTS

Figure 6:
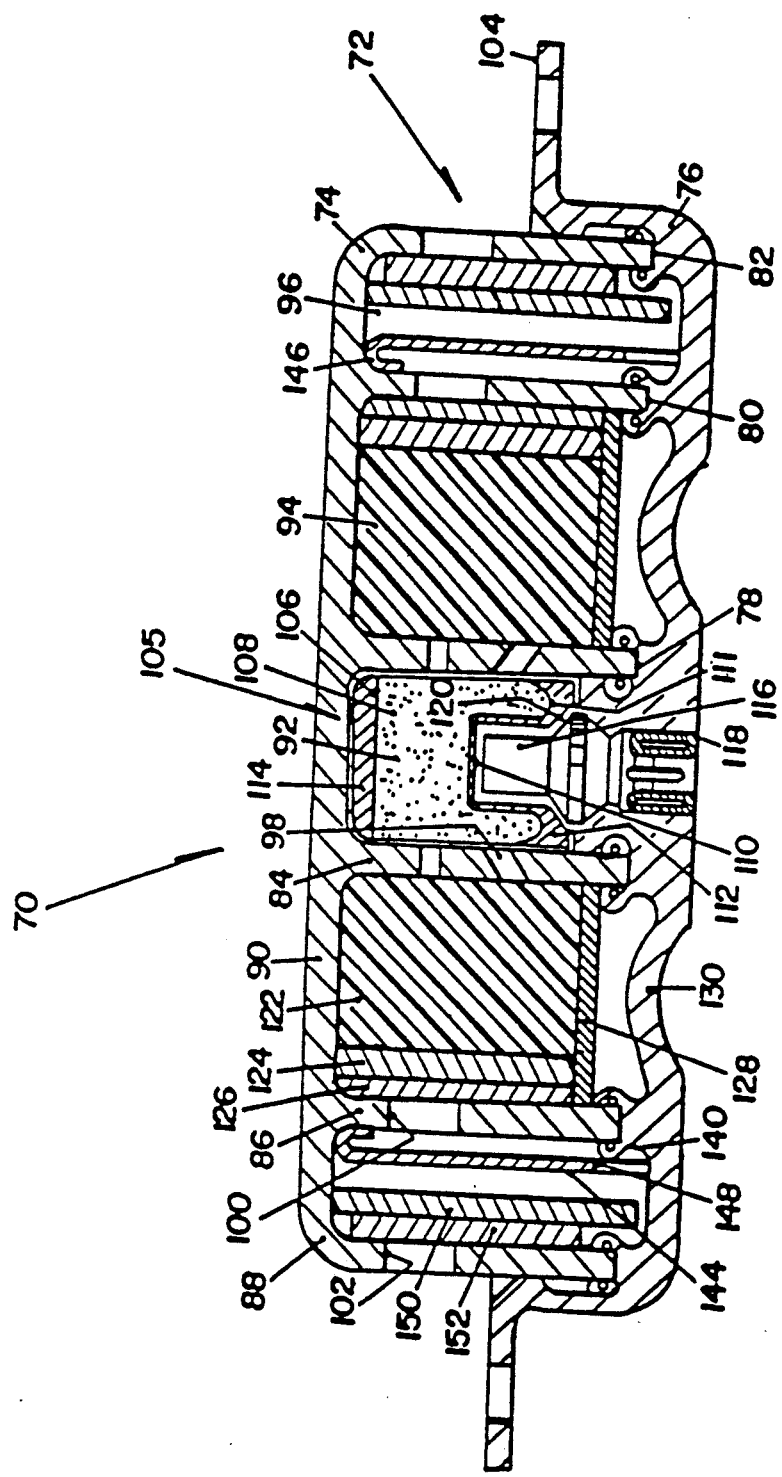
FIG. 6 is a cross-sectional view of a gas bag inflator embodying the present invention.

Referring to FIG. 1, there is shown a canister fired missile at 10 which may be shoulder launched and which includes a launch eject motor 12 and a flight motor 14. The launch motor 12 is a solid propellant motor which is used to eject the flight motor 14, which has a length typically of from about 10 inches to about 6 feet, out of a canister (not shown) afterwhich the flight motor 14 is caused to ignite when it is a safe distance away from the operator. The size of the launch motor 12 is related to the flight motor size. For a flight motor having a length of 40 inches, the launch motor may have a length of about 4 inches.

Referring to FIG. 2, the launch motor 12 includes a generally cylindrical case 16 and nozzle 18. At 21 is shown an electric match or initiator commonly know as a squib which is fired by electric lead wires 22 which enter the nozzle opening through a conventional nozzle plug 20. The ignitor 24, fired by squib 21, expels hot gases onto the surfaces of the launch motor propellant grain illustrated at 28 to initiate burning thereof. After ejecting the flight motor 14 from the canister (not shown), the launch motor 12 is caused to separate therefrom by means of any suitable separation apparatus, generally illustrated at 30, which includes forward closure 31 and a conventional separating piston 23. The closure 31 is releasably held to the flight motor case structure 32 by circumferentially spaced pins 25. Retaining ring 27 retains and aligns the forward closure in position. Such separation apparatus is of a conventional design and can be constructed using engineering principles commonly known to those of ordinary skill in the art to which this invention pertains and will therefore not be described in further detail herein.

Referring to FIG. 3, the flight motor 14 includes a generally cylindrical case 32 which includes a head end 34 and which extends rearwardly therefrom to a nozzle 36 which is molded or otherwise suitably attached to a support member 37 which is in turn sealingly attached to the case wall by means of lock ring 39 and an o-ring seal 41. Contained within the case 32 is a propellant charge 38 which is ignited by igniter 40. Disposed between the propellant charge 38 and the case wall 32 is a layer 42 of suitable insulation and a suitable inhibitor 43. The igniter 40 is initiated by one or more squibs 44 which are electrically fired by lead wires 45 which pass through a through bulkhead connector 47. In order to prevent accidental or premature ignition, a suitable conventional ignition interlock 48 is provided to prevent firing of squibs 44 until after the missile 10 has been ejected from the canister (not shown). Wires for a conventional lanyard assembly are illustrated at 46 and pass through the ignition interlock which also serves as a nozzle closure illustrated at 48.

With the expections of the propellant charge 28 for the launch eject motor 12 and the igniter 40 for the flight motor 14, the missile 10 is of a conventional design and can be constructed using engineering principles commonly known to those of ordinary skill in the art to which this invention pertains. Therefore, the conventional portions of the missile 10 need not and will not be described in any greater detail herein.

Referring back to FIG. 2, in order to prevent the ejection of smoke or exhaust fumes out of the launch motor nozzle 18 which smoke or exhaust fumes may be injurious to the operator and obstruct visibility of the target after launch which is necessary to control the missile, the propellant charge 28 preferably comprises a minimum smoke propellant material such as, for example, a propellant material containing by weight, 5% poly (ethylene glycol), 4% polyfunctional isocyanate, 30% nitrate ester plasticizer, 60% nitramine, and 1% stabilizers (such as N-methyl nitroanaline to scavenge nitrate ester deposition products).

In order to reduce smoke during the ignition phase of the flight motor 14, the igniter 40 for the flight motor 14 also contains a minimum smoke propellant material such as, for example, a propellant material containing, by weight, 47% nitrocellulose, 48% nitrate ester plasticizer, 4% processing aids (such as viscosity modifiers), and 1% stabilizers.

Although many propellants may produce water vapor contrails at high altitudes, propellants which provide high quantities of smoke when burned at or near sea level (where canister fired missiles are usually fired) contain substantial quantities (i.e., 20 per cent or more by weight) of chloride producing compounds such as ammonium perchlorate (which produces hydrogen chloride) and/or substantial quantities (i.e., 10 per cent or more by weight) of metal such as aluminum. If a propellant contains more than about 5 per cent by weight of a metal salt (usually used as a burning rate catalyst), a high quantity of smoke may also result. Therefore, for the purposes of this specification and the claims, a "minimum smoke" propellant or material is defined as a propellant or material which contains, by weight, 0 to 20 percent chloride producing compounds, 0 to 10 percent metal, and 0 to 5 percent metal salts.

In comparison with other rocket motor propellants, a minimum smoke propellant does not burn very fast. However, the addition of lead and/or copper salts to the propellant charges for either the igniter 40 or the launch motor grain 28 in order to increase their burn rates is not considered desirable due to the toxicity of such burn rate catalysts.

In order to decrease the burn time of the propellant charge for the igniter 40 and the launch motor grain 28 without the addition of burn rate catalysts and to eliminate the basket or tube housing for the igniter pellets as well as to provide strength to the propellant charges so that the minimum smoke propellants may withstand acceleration forces during launch, the propellant charges for the igniter 40 and the launch motor grain 28, in accordance with the present invention, are each composed of a reticulated structure, illustrated at 50 in FIGS. 4 and 5, the ligaments 52 of which are coated with a suitable propellant material 54 such that interstices are between the coated ligaments for increased surface area as will be described more fully hereinafter. As shown in FIG. 4 wherein reticulated carbon is illustrated, the reticulated structure 50 is composed of a multitude of such ligaments 52 which are of generally uniform dimension and interconnected with each other to form voids 55 which are open to each other. For the purposes of this specification and the claims, a "reticulated structure" or "reticulated substrate" is meant to refer to a structure or substrate which is composed of a multitude of ligaments which are interconnected with each other to form voids which are open to each other and includes such a structure as described in the Walz patents.

In order to prevent or reduce the production of smoke from burning of the reticulated structure 50 in accordance with an aspect of the present invention, the reticulated structures 50 for both the launch motor grain 28 and the igniter 40 as well as other applications where a minimum smoke propellant is required are each composed of a non-combustible material, i.e., a material which does not burn at the temperatures and conditions under which the coated propellant is burned, or a minimum smoke material. Although carbon and graphite may be combustible under some conditions such as if the propellant mass is oxygen rich, carbon and graphite produce non-smoke producing carbon dioxide when they burn and are thus minimum smoke materials.

Other applications of the coated reticulated structure of the present invention may not require that the propellant charge be smokeless or of a minimum or reduced smoke type in which case it may be preferable that the reticulated structure 50 be composed of combustible material such as, for example, aluminum, boron, beryllium, or copper so that it will also burn as the propellant material burns to provide increased energy. Thus, it should be understood that the reticulated structure 50 of the present invention is not limited to a minimum smoke or non-combustible material.

The ligaments 52 may be sized such that the reticulated structure 50 only occupies between about 1½ and 6% of the volume of a propellant charge. The coating 54 may be applied to the ligaments 52 by any suitable means commonly known to those of ordinary skill in the art to which this invention pertains such as by dip coating or by spraying onto the ligaments a propellant lacquer prepared by dissolving a propellant material in a suitable solvent such as acetone and then allowing the material to dry on the ligaments. The thickness, illustrated at 56 in FIG. 5, of the coating 54 is determined by applying engineering principles of common knowledge to those of ordinary skill in the art to which this invention pertains in order to achieve desired impulse and other performance requirements. However, in accordance with the present invention, the thickness 56 of the coating 54 is such that interstices, illustrated at 58, are between the interconnected coated ligaments to define propellant surface area 60 for combustion. It may be necessary to repeat the process of dip coating or spraying and then drying several times to allow a build-up of propellant material to the thickness 56 desired. The thickness may be such that the interstices 58 are so small as to be hardly noticeable to the eye so that, taking into consideration the volume taken up by the reticulated structure 50, a very high percentage of perhaps 90 to 97½% of the available volume of a propellant charge is occupied by propellant material but yet the surface area 60 for rapid burning may be increased by perhaps on the order of 500 per cent or more.

Referring to FIG. 6, there is shown generally at 70 a gas generator or inflator assembly according to the present invention for the generation of gas to inflate a vehicle inflatable crash protection bag. Inflator 70 has a generally cylindrical external outline and includes a housing construction 72 comprising two structural components. The two structural components comprise an upper shell or diffuser 74 and a lower shell or base 76 which are joined by three concentric inertia welds shown at 78, 80, and 82 to form the housing construction 72 of the inflator assembly 70. The three inertia welds are performed simultaneously in a single inertia welding operation.

The diffuser 74 may be formed by forging with three concentric cylinders 84, 86, and 88, each of which cylinders extend downwardly from a common flat upper wall 90 of the diffuser 74 to form a separate weld interface with the base 76. The inner cylinder 84, in cooperation with wall 90 and base 76, forms a cylindrical igniter chamber 92. The intermediate cylinder 86, in cooperation with the inner cylinder 84, wall 90, and base 76, forms an inner chamber having the shape of a toroid, specifically, a combustion chamber 94. The outer cylinder 88, in cooperation with the intermediate cylinder 86, wall 90, and base 76, forms an outer chamber 96 that also has the shape of a toroid. Cylinders 84, 86, and 88 each include a plurality of uniformly spaced exhaust openings or ports 98, 100, and 102 respectively through which the generated or inflation gas flows into a protective air bag (not shown) to be filled. The base 76 includes an interface attachment flange 104 which is used to attach the inflator assembly 70 to a vehicle the occupants of which are to be protected.

Positioned within the igniter chamber 92 is an igniter charge assembly 105 comprising a rupturable closed aluminum container 106 containing igniting material 108. Container 106 may be hermetically sealed against moisture, has a recess or cavity 110 formed in the bottom 111 thereof, and is retained in chamber 92 by a retaining ring 112. Retaining ring 112 has a shape conforming to the bottom 111 of container 106 including recess 110 and may be inserted in the end of chamber 92 in press fit relation therewith. At the top end thereof, container 106 is held in spaced relation with the inner surface of wall 90 by cushion/spacer material 114 which desirably may comprise a cerafiber material.

Although various pyrotechnic materials may be employed for igniter material 108, a preferred material is a granular mixture of 25% by weight of boron and 75% of potassium nitrate. This mixture has been found to burn with a very hot flame that is suitable for igniting the solid fuel gas generant material employed in the inflator assembly 70, as described hereinafter.

Extending into recess 110 of container 106 is an initiator 116. Initiator 116, as shown, has a conically shaped lower portion and is mounted in a hole 118 having a mating conically shaped upper portion, the hole 118 being provided at a central location in base 76. Initiator 116 is retained in hole 118 by a crimp 120 that is formed in base 76 at the upper end of hole 118 and which overlaps and engages the conically shaped upper portion of initiator 116. Initiator 116 may be a conventional electric squib having a pair of energizing electrical terminals (not shown) that are adapted for plug-in connection to external crash sensor means (not shown).

In order to achieve a rapid burn time for a slow burn rate propellant material so that a suitable slower burn rate propellant material may be used for gas generation in accordance with the present invention, a generally doughnut-shaped propellant charge 122, which includes a reticulated structure similar to the reticulated structure 50 of FIG. 4, preferably composed of a minimum smoke material such as carbon or graphite, or a noncombustible material, and which is coated with a suitable propellant material preferably a minimum smoke propellant, as described above, is contained within the toroidal combustion chamber 94.

Propellant charge 122 is surrounded by an annular inner screen pack or combustion chamber filter 124. Inner screen pack 124 may desirably include a layer 126 of coarse screen adjacent to the inner surface of concentric cylinder 86. An aluminum washer-shaped retaining ring or disk 128 holds the propellant charge 122 and inner screen pack 124 in place and away from the base 76 during the inertia welding operation.

The internal surface of the base 76 includes a circular rounded ridge 130. This ridge 130 serves to reduce the free volume of combustion chamber 94. Additionally, during functioning of inflator assembly 70, ridge 130 provides support for the retainer disk 128.

In the outer toroidal chamber 96, an aluminum deflector ring 144 is provided. Deflector ring 144 is formed with an inwardly directed curved flange 146 at its upper end and has a plurality of uniformly spaced exhaust openings or ports 148 adjacent the bottom end thereof. Ring 144 has a length at least as long as concentric cylinder 86 and is positioned in embracing relation with the latter with flange 146 in press fit engagement with the outer surface of cylinder 86 at the inner end thereof and engaging weld flash 140 at the outer end thereof. Also included in the toroidal chamber 96 is an outer screen pack or filter 150. Screen pack 150 may desirably include a coarse layer 152 adjacent the inner surface of cylinder 88.

Functioning of the inflator assembly 70 begins with an electrical signal from a crash sensor (not shown) to the initiator 116. The initiator fires into and pierces the closed aluminum container 106 that holds the igniter material 108. The igniter material 108 burns and bursts through the walls of the container 106 and flows through the exit openings 98 in the inner cylinder 84 and into the toroidal combustion chamber 94. The hot igniter gases ignite the propellant charge 122 which releases inflator gases. These gases flow through the inner screen filter pack 124 and radially outward through the combustion chamber exit openings 100. The screen filter pack 124 serves to cool the inflator gases and to remove particulate residue therefrom. As the gases exit the combustion chamber openings 100, they are turned downward by deflector ring 144 where they strike flashing 140 from the intermediate cylinder inertia weld 80. The flashing 140 serves to interrupt the gas flow which helps to further remove particulate matter from the exhaust gases. The inflation gases then flow radially outward through openings 148 in the deflector ring 144 and up into the annular space between deflector ring 144 and outer screen pack 150, through the latter, and finally radially outward through the exit openings or port holes 102. The outer screen pack 150 serves to further cool the exhaust gases and remove particulate matter.

More detailed information concerning such an inflator is contained in the aforesaid patent to Adams et al, which is hereby incorporated herein by reference and made a part hereof. It should be recognized, of course, that pellets of the prior art rather than the coated reticulated structure of the present invention is disclosed as composing the propellant charge in Adams et al.

In order to prepare a propellant charge in accordance with the present invention, a reticulated substrate 50 is first prepared by the method described in the Walz patents or by any other suitable method. Then the ligaments 52 of the reticulated substrate 50 are coated with a suitable solid propellant material 54 as previously described by dip coating, spraying, or by any other suitable coating method which may require several coats as previously discussed. The coat or coats of material 54 are then allowed to dry on the ligaments 52 while interstices 58 are maintained between the coated ligaments to define propellant surface area 60 for combustion.

The resulting propellant charge may be installed as a rocket motor propellant or igniter, a gas generant for an air bag, or in other suitable applications utilizing principles commonly known to those of ordinary skill in the art to which this invention pertains. For example, a propellant charge embodying the present invention for an igniter such as igniter 40 may be suitably attached, by use of a set of threads (not shown) or bonded to a suitable structural support (not shown) of a rocket motor, and a propellant grain such as grain 28 embodying the present invention may be suitably bonded to the case such as case 16 of a rocket motor.

As an example, an embodiment of the present invention has been tested by dip coating a mixture of butanetriol trinitrate (BTTN) and nitrocellulose (NC) prepared in an acetone solution onto reticulated carbon. The following is data from samples prepared by dip coating a 50/50 (weight/weight per cent) BTTN/NC solution in acetone (50%) onto reticulated carbon which has 45 pores per inch:

| Sample No. | Weight of Carbon (g) | Weight of BTTN/NC (g) | Burn Time at 1,000 psi (in./sec.) |
|---|---|---|---|
| 1 | 0.0702 | 0.5535 | 7.87 |
| 2 | 0.0822 | 0.6565 | 6.211 |
| 3 | 0.0895 | 0.7568 | 5.84 |
| 4 | 0.0796 | 0.6095 | 13.69 |

A typical burn time at 1000 psi for the tested propellant material in a conventional solid form without interstices therebetween is between about 0.2 and 0.4 in. per sec. Thus, the test results show that a burn time several times greater than the typical burn time of a propellant material may be achieved by a propellant charge which is composed of the propellant material and which embodies the present invention. Samples of the tested propellant charge were prepared and burned in a window bomb wherein large amounts of subsurface combustion (i.e., combustion in the interior of the coated reticulated structure) were observed.

If the reticulated structure 50 is non-combustible, the remaining structure after combustion may serve as a combustion stabilizer by the damping of pressure or sound waves and may also serve as a means for disrupting gas flow vortex formation. In addition, a carbon reticulated structure may be grounded to the motor case to prevent the hazards of static discharge.

Since the total surface area available for burning in a coated reticulated structure embodying the present invention is so large, such a coated reticulated structure is provided to achieve a fast burn time no matter what the burn rate of the propellant material coated thereon.

It is to be understood that the invention is by no means limited to the specific embodiments which have been illustrated and described herein, and that various modifications thereof may indeed be made which come within the scope of the present invention as defined by the appended claims.

What is claimed is:

1. Apparatus comprising a vehicle inflatable crash protection bag means, a gas generant charge which is operable upon ignition to produce gas, said gas generant charge includes a reticulated substrate having a quantity of interconnected ligaments and a coating of solid gas generant composition on said ligaments, said coating has a thickness such that interstices are between coated ligaments which interstices define open gas generant surface area for supporting combustion, ignition means to ignite said gas generant composition, and means for flowing the gas into said vehicle inflatable crash protection bag means for inflation thereof.

2. Apparatus according to claim 1 wherein said reticulated substrate is composed of a material selected from the group consisting of carbon and graphite.

3. Apparatus according to claim 1 wherein said reticulated substrate comprises less than about six percent of the volume of said gas generant charge and said gas generant composition comprises at least 90 percent of the volume of said gas generant charge.

4. Apparatus according to claim 2, wherein said gas generant composition comprises at least 90 percent of the volume of said gas generate charge.

5. Apparatus according to claim 3 wherein said reticulated substrate is composed of a material selected from the group consisting of carbon, graphite, and a non-combustible material.

6. Apparatus comprising a vehicle inflatable crash protection bag means, a gas generant charge which is operable upon ignition to produce gas, said gas generant charge includes a reticulated substrate having a quantity of interconnected ligaments and a coating of solid gas generant composition on said ligaments, said coating has a thickness such that interstices are between coated ligaments which interstices define open gas generant surface area for supporting combustion, said gas generant composition comprises at least 90 percent of the volume of said gas generant charge, ignition means to ignite said gas generant composition, and means for flowing the gas into said vehicle inflatable crash protection bag means for inflation thereof.

7. Apparatus according to claim 6 wherein said reticulated substrate is composed of a material selected from the group consisting of carbon, graphite, and a non-combustible material.

8. Apparatus comprising a vehicle inflatable crash protection bag means, a gas generant charge which is operable upon ignition to produce gas, said gas generant charge includes a reticulated substrate composed of a material selected from the group consisting of carbon, graphite, and a non-combustible material and having a quantity of interconnected ligaments and a coating of solid gas generant composition on said ligaments, said coating has a thickness such that interstices are between coated ligaments which interstices define open gas generant surface area for supporting combustion, ignition means to ignite said gas generant composition, and means for flowing the gas into said vehicle inflatable crash protection bag means for inflation thereof.

9. Apparatus according to claim 8 wherein said reticulated substrate is composed of a material selected from the group consisting of carbon and graphite.

* * * * *